United States Patent [19]

Otto

[11] Patent Number: 4,774,696
[45] Date of Patent: Sep. 27, 1988

[54] AIRGUN VALVE WITH SLIDABLE VALVE SEAT

[75] Inventor: Bernard Otto, Arlington, Tex.

[73] Assignee: Mobil Oil Corporation, New York, N.Y.

[21] Appl. No.: 98,336

[22] Filed: Sep. 18, 1987

Related U.S. Application Data

[62] Division of Ser. No. 027,369, Mar. 18, 1987, Pat. No. 4,715,023.

[51] Int. Cl.$^4$ ............................................. H04R 23/00
[52] U.S. Cl. ..................................... 367/144; 181/120
[58] Field of Search ................ 367/142, 144; 181/110, 181/120; 251/359, 343, 169, 210, 31

[56] References Cited

U.S. PATENT DOCUMENTS

| | | | |
|---|---|---|---|
| 3,654,950 | 4/1972 | Hamm | 251/359 |
| 3,960,364 | 6/1976 | Hargrave | 251/210 |
| 4,623,033 | 11/1986 | Harrison, Jr. | 181/120 |
| 4,674,575 | 6/1987 | Guess | 251/359 |

Primary Examiner—Charles T. Jordan
Assistant Examiner—John W. Eldred
Attorney, Agent, or Firm—Alexander J. McKillop; Michael G. Gilman; Charles J. Speciale

[57] ABSTRACT

A dual chamber seismic air gun which discharges both chambers simultaneously to counterbalance the reactive forces generated by the discharges. The chambers are symmetrical within the housing of the gun so that the movement of the internal parts during operation also counterbalance each other. The gun is mounted coaxially on the air supply of a seismic array to provide a good profile for towing.

4 Claims, 4 Drawing Sheets

AIRGUN VALVE WITH SLIDABLE VALVE SEAT

This is a divisional of copending application Ser. No. 027,369, filed on Mar. 18, 1987 U.S. Pat. No. 4,715,023.

DESCRIPTION

1. Technical Field

The present invention relates to a source for producing acoustic waves in the water during marine seismic exploration commonly called an "air gun" and more particularly relates to an air gun which is coaxially aligned with the main air hose bundle to reduce drag and which has dual chambers which discharge simultaneously to balance reactive forces.

2. Background Act

In marine seismic surveys, a source of acoustical energy is used to generate sonic pulses or shock waves in the water. These waves travel downward in the water, through the water bottom, and through the earth formations underlying the bottom. Part of the acoustical waves passing through the earth formations underlying the bottom are reflected upward therefrom and are sensed by sensors, (e.g. streamers of hydrophones) which convert the acoustical waves to electronic signals. The streamer(s) are normally towed by the same vessel that is towing the acoustical energy source. These signals are then conditioned and processed to provide valuable information both as to the composition of the various formations and to the possibility that such formations may contain mineral deposits such as hydrocarbons.

Several different types of acoustical energy sources have been used in the past to produce the shock waves required in seismic surveys. For example, explosives have been detonated for this purpose but this technique is dangerous and is now considered ecologically unacceptable. Another early device, e.g. gas guns, detonated combustible gases in a chamber and then discharged the resultant charge into the water to produce the shock waves. Again, certain risks were obviously involved in the use of such guns.

Accordingly, in recent years, a type of acoustic energy source known as an "air gun" has come into widespread use and has achieved a high degree of success. In an air gun, a charge of compressed air under high pressure, e.g. 2000-6000 psi, is supplied to a chamber in the gun. When "fired", a valve rapidly opens to discharge the charge of air into the water. The valve then closes and the chamber is repressured with air and the firing is repeated as often as desired. Although air guns have proven much safer and more ecologically acceptable than the previous detonation type devices, there, nevertheless, remain several drawbacks which were present in the prior art devices.

For example, in a typical marine seismic array, several acoustical sources or guns are spaced along an air gun hose assembly which is comprised of a single or a plurality of compressed air supply hoses and a bundle of electrical control lines for firing the guns and determining the instant that the guns fires, all of which may be encased in a protective jacket. Each gun is suspended below the air gun hose assembly at spaced points thereon and each has an individual air hose and control lines extending from the jacket. Further, a stress-bearing member, e.g. chain or cable, normally runs parallel and is connected at spaced intervals to the air gun assembly to absorb the tension exerted thereon during towing. To maintain the air gun assembly, guns, and stress member at a desired depth during towing, a plurality of surface buoys or the like are connected to the air gun assembly at spaced points by means of tie links or the like; see U.S. Pat. Nos. 3,893,539 and 4,313,392 for examples of such seismic arrays.

This typical array, while successful, is difficult and time consuming to deploy and retrieve from a vessel. Also, it presents a bulky profile which inherently produces substantial "drag" forces on the array when towed through the water. These forces necessitate the expenditure of large amounts of power by the vessel's engines while towing the array, thereby adding substantially to the expense of a particular seismic survey.

Another drawback of prior air guns reside in the fact that they normally have a single chamber which discharges air at a single point along its housing. The air is discharged by rapidly opening a valve mechanism. The valve mechanism in single chamber air guns undergoes constant, rapid acceleration and deceleration and the forces developed thereby can lead to substantial wear on the gun, the air gun hose assembly, and the connections between the guns and the hose assembly. The air is sometimes discharged in an asymmetric manner which contributes further to the unbalanced reactive forces.

One known dual chamber air gun has been proposed, see U.S. Pat. No. 4,381,044, that "fires" both chambers simultaneously. This gun use one valve mechanism to fire both chambers, thereby producing the same unbalanced reaction forces as those experienced with prior art single chamber guns.

DISCLOSURE OF THE INVENTION

The present invention provides a dual chamber, marine seismic air gun wherein both chambers are fired to discharge air from both chambers simultaneously, thereby effectively counterbalancing the reactive forces generated thereby. Further, due to the symmetrical construction and positioning of the chambers in the housing of the gun, the operation of the respective valve mechanisms are always equal and opposite thereby effectively counterbalancing the internal forces developed during operation of the gun. Still further, the present gun is mounted coaxially into the main air supply passage of the air gun hose assembly to provide a streamlined profile which substantially reduces the drag forces on the array during towing.

More specifically, the air gun of the present invention is comprised of an elongated housing which is substantially symmetrical about its midpoint wherein the two ends of the housing are substantially mirror-images of each other. The housing has a central bore extending therethrough which lies concentrically on the longitudinal axis of the housing. Hose connectors are provided on each end of the bore to connect the housing into the main air supply passage of an air gun hose assembly so that the central bore is coaxial with and forms an integral part of the air passage.

A pair of chambers, each having an inlet and an outlet, are provided in the housing, with one chamber being positioned in each end of said housing. Each chamber is concentric to and surrounds the central bore through the housing. The outlet of each chamber is preferably a 360° opening around the housing and is spaced an equidistance from a respective end of said housing. Each chamber has a piston sleeve valve which is slidably mounted in the housing to open and close the outlet of its respective chamber.

Passage means are provided in the housing to supply air simultaneously from the central bore to the inlets of the chambers while the outlets of the chambers are closed by the valves to thereby simultaneously charge the chambers with air under pressure. When it is desired to "fire" the gun, an electrical signal actuates a solenoid valve means on said housing to direct air simultaneously from the air chambers to identical firing chambers in the housing. Each firing chamber is formed between the housing and a reaction surface on its respective piston sleeve valve. When air flows into the firing chambers, each valve begins to move toward its open position. After this initial movement, a port in each piston is uncovered thereby rapidly driving the pistons to their open positions where the outlets of the chambers are fully opened to allow simultaneous discharge of air from the chambers into the water.

BRIEF DESCRIPTION OF THE DRAWINGS

The actual construction, operation, and apparent advantages of the present invention will be better understood by referring to the drawings in which like numerals identify like parts and in which.

BEST MODE FOR CARRYING OUT THE INVENTION

Figure 1:
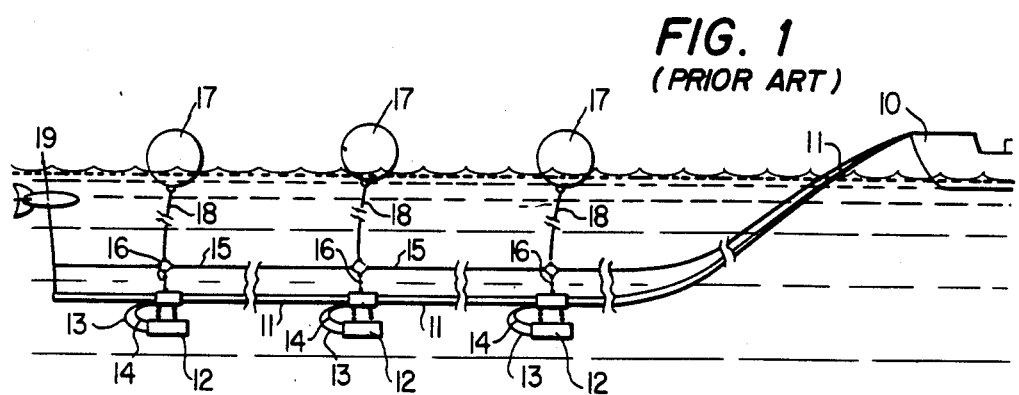
FIG. 1 is an illustration of a typical seismic source air gun array in accordance with the prior art.

Referring more particularly to the drawings, FIG. 1 discloses a typical prior art seismic source subarray or array of the type commonly used to carry out a marine seismic survey. An array is normally composed of one or more subarrays. The array is towed by a vessel 10 and is comprised of an air gun hose assembly 11, which, in turn, is comprised of a single or multiple compressed air supply hoses and a number of an electrical control lines. Positioned along the assembly and suspended therefrom are a plurality of air guns 12. Individual air hoses 13 and electric control lines 14 are run from the assembly 11 to each air gun 12, as shown. A stress-absorbing member 15 (e.g. chain) runs parallel to bundle 11 and is connected at spaced intervals by links 16. Also, a plurality of buoys 17 are connected to chain 15 by ties 18. As will be understood, a paravane buoy arrangement 19 or the like may be mounted at either end of main bundle 11 to aid controlling the depth and/or spacing of subarrays within the array and/or the direction of the array with respect to vessel 10. It can be seen that the deployment and retrieval of such arrays are involved and time consuming. Also, the general makeup of these arrays present a bulky profile that inherently generates substantial drag forces as vessel 10 tows the array through the water. Obviously, these forces puts substantial stresses on the array and its components and severely limits the speed at which the array can be towed.

Further, it can be seen that each gun 12 requires separate air and electrical connections 13, 14 from assembly 11 which are exposed to the drag forces and substantial flexing during towing operations. These factors increase wear and are likely to shorten the operational life of the array.

Still further, previous air guns normally have only one chamber therein which discharges air into the water at only one point on the housing. The reaction forces generated by this discharge of air and those developed by the internal movement of the valving mechanism within the housing contribute substantially to the wear on the air gun.

Figure 2:
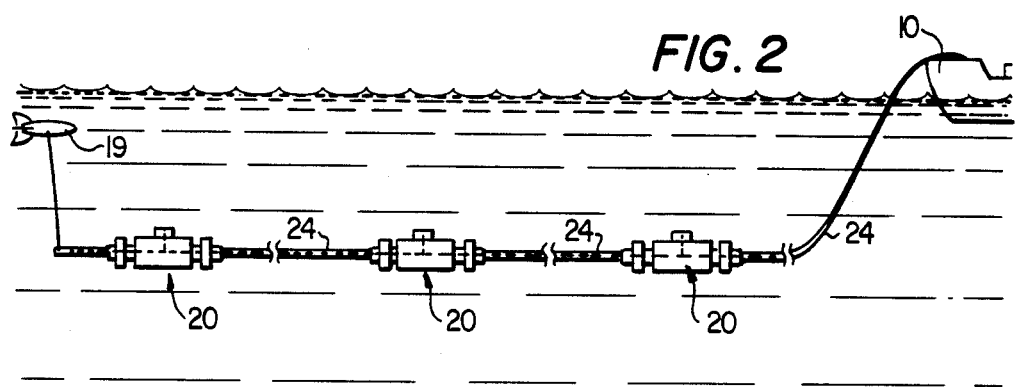
FIG. 2 is an illustration of a seismic source air gun array in accordance with the present invention.

Turning now to the present invention, FIG. 2 illustrates a marine seismic array in accordance with the present invention. The array is comprised of a plurality of air guns 20 which are spaced and joined together by lengths of array bundle 24. The details of gun 20 will follow but basically gun 20 is comprised of a housing having two symmetrical ends 21a and 21b (FIG. 3) which are substantially mirror-images of each other. A central bore extends through the housing along the longitudinal axis thereof and is adapted to be connected at each end to the main air supply passage in bundle 24 so that the bore in the housing forms a continuous part of the air supply passage through the array. As can be seen, gun 20 is mounted coaxial into bundle 24.

Identical cylinders or chambers are formed in ends 21a, 21b of the housing and simultaneously receive and store a charge of high pressure air from the central bore in the housing. A solenoid valve on gun 20 is actuated by a control signal which, directs air for simultaneously opening the valves associated with the dual chambers to simultaneously discharge the air therefrom through 360° ports 22a, 22b (FIG.3).

The lengths of bundle 24 may be constructed in a variety of known ways. Preferably, a high pressure, air supply hose forms the center core of the bundle with reinforcing, stress-absorbing members wrapped therearound. The wrapped hose is then encased in a buoyant casing to provide a neutral buoyancy for the bundle 24 and air guns 20, thereby eliminating the need for spaced buoys along the array.

It can be seen by comparing the arrays shown in FIG. 1 and FIG. 2, the air guns 20 of the present invention are coaxially mounted on the towing bundle and since air is supplied directly from the main supply passage into and through the housing of each gun, there is no need for individual air hose 13 and electrical leads 14 at the individual guns as before. Further, in the present invention, as will be explained more fully below, the control lines (e.g. electrical lines, fiber optics, etc.) are positioned within the main air passage and runs through the central bore in the housing so they are never exposed to the water or any drag forces during towing; therefore, there is no need for an electric lead 14. Accordingly, the present array provides a compact and streamlined profile which significantly reduces the drag forces encountered during towing.

Figure 3:
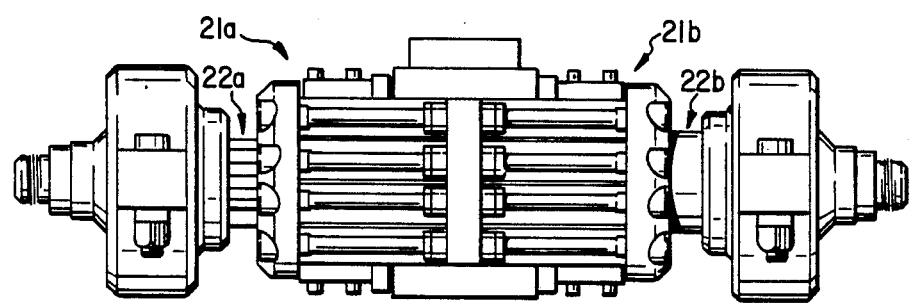
FIG. 3 is a perspective view of the air gun of the present invention.
Figure 4:
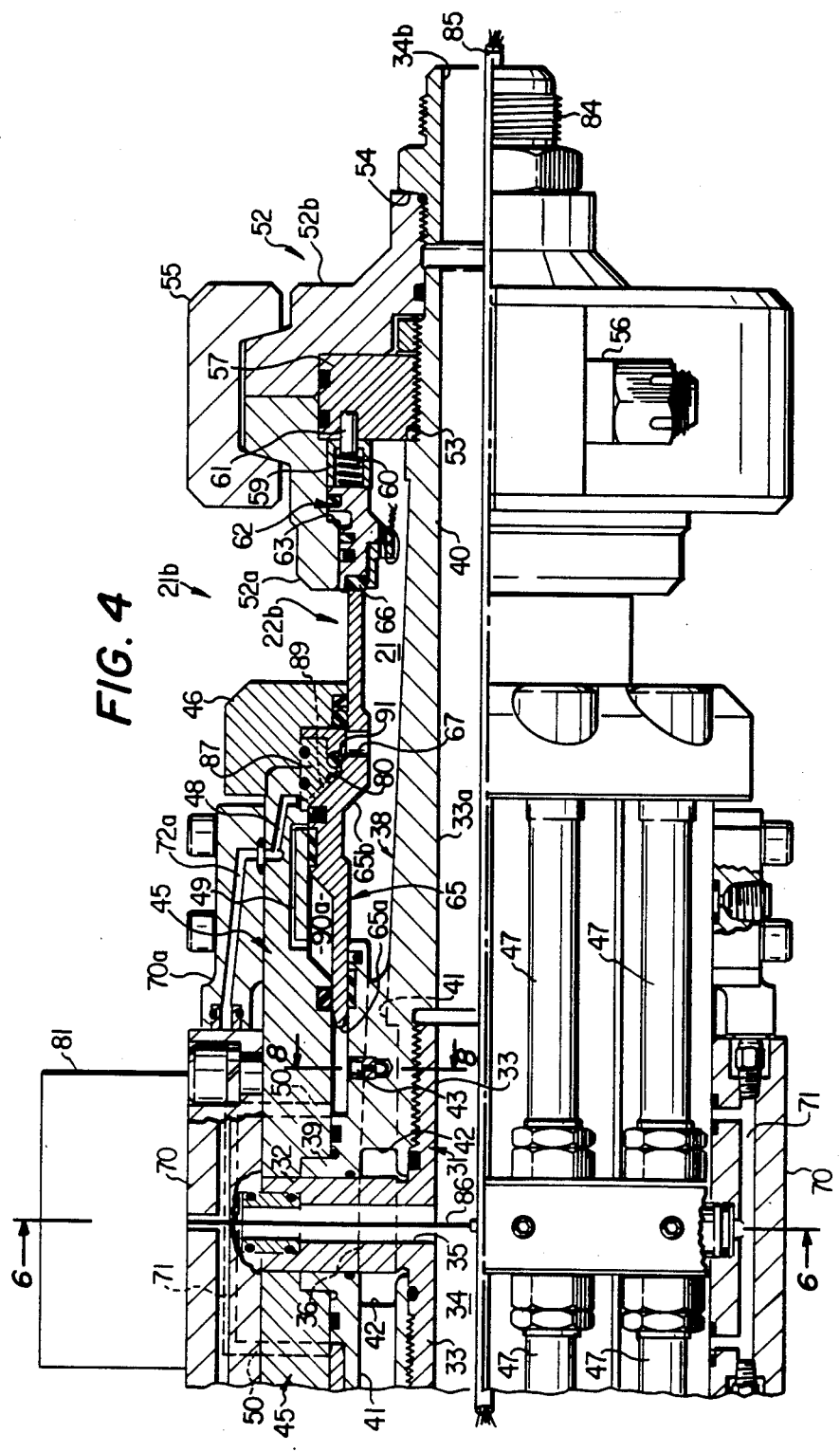
FIG. 4 is a coss-sectional view of one end of the air gun of FIG. 3 with the chamber in a closed position.
Figure 5:
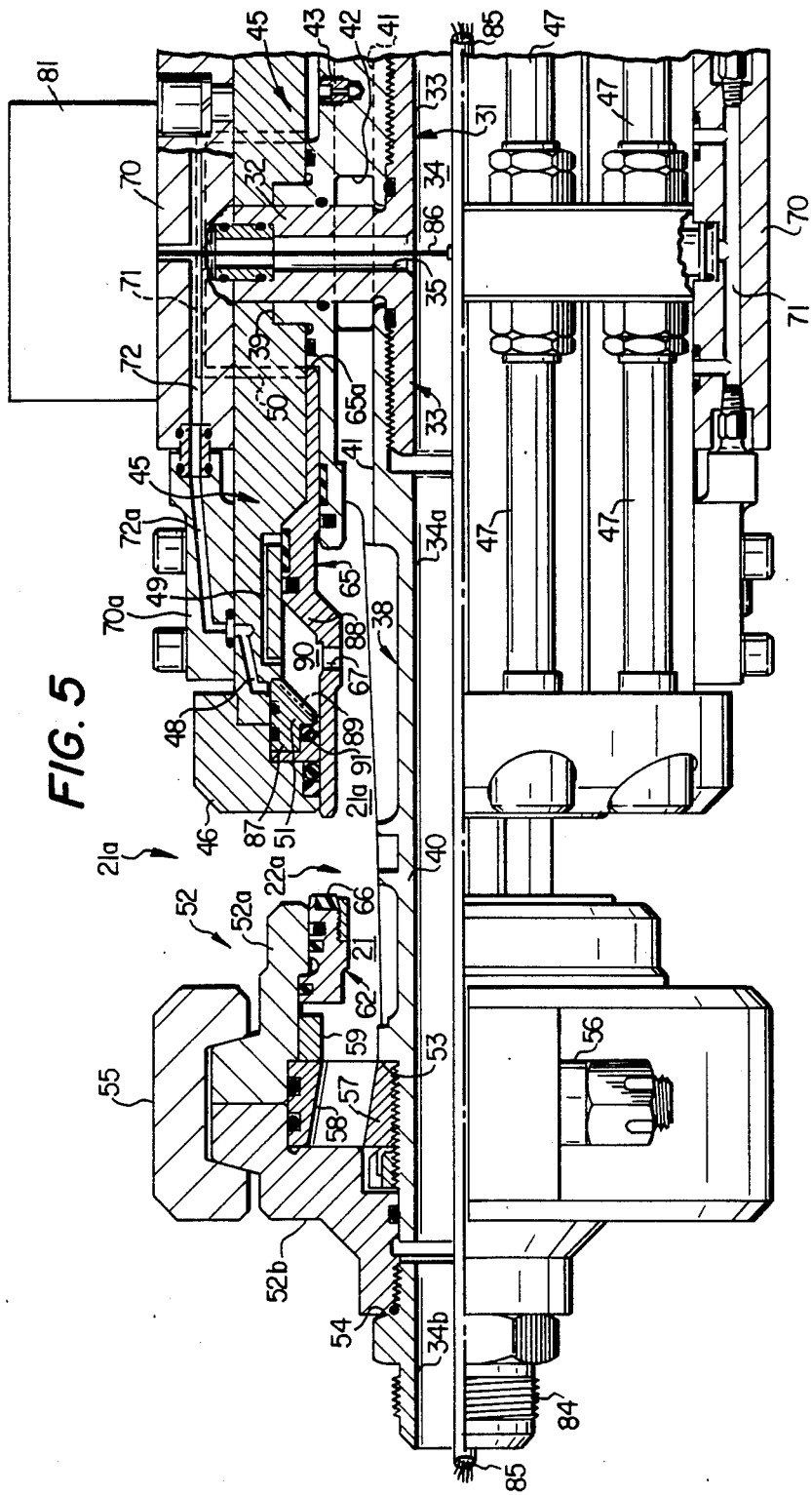
FIG. 5 is a cross-sectional view of the other end of the air gun of FIG. 3, with the section slightly rotated from that of FIG. 2, with the chamber in an open position.

Turning now to the details of gun 20, FIGS. 4 and 5 disclose the two ends 21b, 21a, respectively of gun 20 of FIG. 3. Ends 21b, 21a in FIGS. 4 and 5 are substantially identical to each other except in the figures, the sectional lines have been slightly rotated to disclose further structural details of the various components. FIG. 4 shows the discharge valve in a closed position while FIG. 5 shows the valve in an open position.

Air gun 20 is comprised of an elongated housing, which as illustrated, is formed from several separate components which are screwed or bolted together. Positioned in the middle of the housing is a coupler 31 (FIGS. 4, 5, 6) which is comprised of center flange 32 which has integral, threaded extensions 33 concentrically positioned thereon and extending from either side thereof. A horizontal bore 34 extends through both extensions 33 and flange 32 and intersects with vertical bore 35 which extends through flange 32 of coupler 31. As used herein, the terms "horizontal" and "vertical" are relative terms as they would apply when the longitudinal axis of gun 20 is horizontal.

Also, a plurality of separate, horizontal bores 36 (FIG. 6, dotted lines in FIGS. 4 and 5) extend through flange 32 around horizontal bore 34 for a purpose described later. Flange 32 has a second vertical passage 37 (FIG. 6) parallel to bore 35, which extends from one of horizontal bores 36 to the exterior of flange 32. The purpose of these various bores will become obvious when the operation of the gun is described below.

Figure 8:
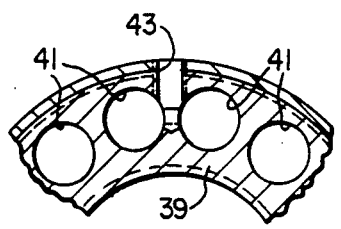
FIG. 8 is a partial sectional view, partly reduced, taken along line 8—8 of FIG. 4.

Elongated centerbodies 38 are threaded to respective extensions 33 and are substantially identical in construction. Each centerbody 38 is comprised of a flange 39 and an integral, elongated cylindrical extension 40. A horizontal bore 34a extends through flange 39 and extension 40 of centerbody 38 and is coaxially aligned with bore 34 of coupler 32 to form a continuous horizontal passage throughout the housing of gun 20. Further, a plurality of separate, radially spaced horizontal bores 41, parallel to but isolated from bore 34a, extend through flange 39 of centerbodies 38. All of bores 41 are fluidly connected to each other at one end by annular plenum 42 in flange 39. At least two of the horizontal bores 41 are in fluid communication with vertical bleed port 43 (FIGS. 4, 5, and 8) in centerbody 38.

Mounted on each centerbody 38 is a cylindrical piston cylinder body 45 which is held in position by cylinder head 46 and the related elongated bolts 47. Cylinder body 45 has three ports 48, 49, 50, the purposes of which will become obvious in the following discussions. Sealing support 51, on which appropriate seals are carried, is provided between cylinder body 45 and cylinder head 46.

Mounted near the outer end of each extension 40 of centerbody 38 is seal housing 52. As shown, seal housing 52 is constructed in two parts 52a, 52b and is positioned between shoulders 53, 54 on extension 40 and is held in place by clamp 55 and bolts 56. It can be seen that there is a gap between cylinder head 46 and seal housing 52 (FIG. 5) which extends 360° around the housing of gun 20. This gap forms the outlet 22a, 22b of the respective chambers 21a, 21b formed by respective cylinder bodies 45.

Positioned within seal housing 52 is annular spider 57 having a plurality of radially spaced horizontal bores 58 (FIG. 5) which act to effectively increase the volume of chambers 21. Positioned in abutment with spider 57 is annular spring retainer 59 which retains a plurality of radially spaced compression springs 60 (only one shown in FIG. 4). A single pin 61 (FIG. 4) connects retainer 59 to spider 57 to prevent rotational movement therebetween. Slidably mounted in seal housing 52 is sliding seal means 62 which is normally based by springs 60 to the position shown in FIG. 5.

Slidably mounted between flange 39 of centerbody 38 and cylinder body 45 is sleeve valve piston 65 which moves between a closed position (FIG. 4) and an open position (FIG. 5). When in the closed position, the outer end of piston 65 abuts and seals with annular seal 66 (e.g. Delrin) which is carried by seal means 62. Piston 65 has a vertical port 67 therein for a purpose described below.

Figure 6:
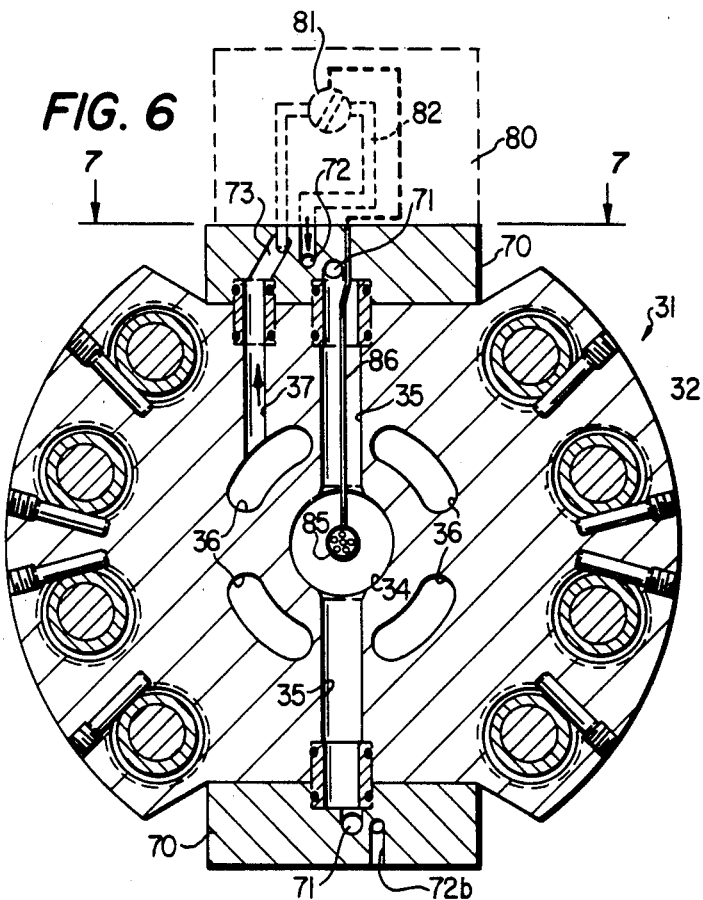
FIG. 6 is a sectional view taken along line 6—6 of FIG. 4.
Figure 7:
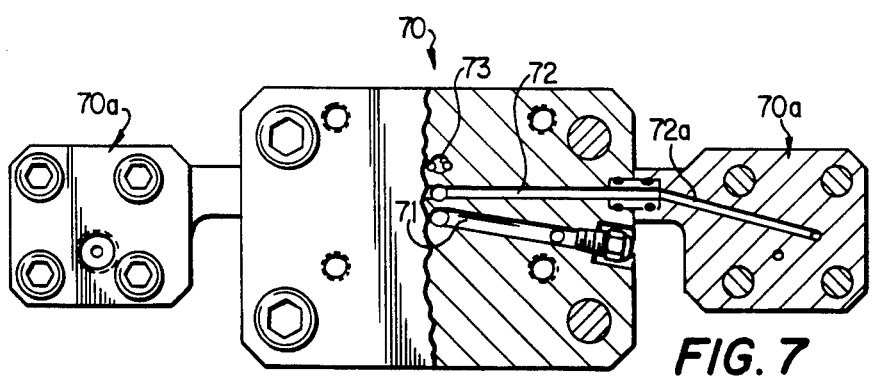
FIG. 7 is top view, partly in section, taken along line 7—7 of FIG. 6 and rotated 90° from FIG. 6.

Mounted on the upper and lower surfaces of the housing of gun 29 are manifold blocks 70, which for all practical purposes are identical. Each block has two horizontially extending passages 71, 72 therein. Passage 71 fluidly communicates vertical bore 35 in coupler 31 with passages 50 in cylinder bodies 45. Passage 72 fluidly communicates the upper exterior of block 70 to passages 72a in auxillary blocks 70a (FIG. 7) which, in turn, communicate with passages 48 in cylinder body 45. Upper block 70 also has a vertical passage 73 therein which communicates the upper surface of block 70 and passage 37 in coupler 31. An actuation means, i.e. solenoid-operated valve 80, is mounted on the upper block 70. As schematically shown in FIG. 6, solenoid-valve means 80 opens or closes valve 81 in passage 82 therein which, in turn fluidly communicates vertical passage 73 with passage 72 within upper block 70 when open.

A control wire bundle 85 is positioned within the main air passage in bundle 24 (FIG. 2) and passes through central bore 34, 34a (FIGS. 4, 5, 6) of the housing of gun 20. Lead 86 is run from wire bundle 85, through vertical bore 35, to solenoid means 80 to provide the signal necessary to actuate the solenoid means 80.

Threaded into seal housing 52 at either end of the housing of air gun 20 is a hose connector 84 which has a horizontal bore 34b therethrough which aligns with passages 34, 34a to provide a continuous, open central passage through gun 20 which lies along the central, longitudinal axis of the housing. Connectors 84 connect gun 20 to the main air passage lengths 24 of the array hose bundle. Now that the structural details of the invention have now been fully described, the operation thereof follows.

Air guns 20 are coaxially assembled into an array as shown in FIG. 2 with the air supply passage of bundle 24 being connected directly to bore 34 of each gun 20. It can be seen that high pressure air constantly flows through bundle 24 and through each air gun 20. Lead 86 in each air gun 20 is coupled to the proper line in electric line bundle 85 which, in turn, passes through and is contained in the air passage of bundle 24 and guns 20.

Air under pressure, e.g. 2000 psi, flows through bundle 24 and through horizontal bore 34 in gun 20. Air flows from bore 34 into vertical bore 35, through passages 71 in manifold blocks 70, and into passages 50 in cylinder body 45. This air flows in behind piston sleeve valve 65 which acts on surface 65a thereof to move valve 65 to a closed position (FIG. 4) and hold it there. In this position, the outer end of piston sleeve valve 65 abuts against seal 66 on sliding seal means 62 which is biased into good contract by springs 60.

When valve 65 is in a closed position, air from passages 50 bleeds through bleed port 43, passages 41, plenum 42, and into bores 36 of coupler 31 (FIG. 6). Air from passages 41 flows simultaneous into chambers 21 in each end of the housing. Air will continue to flow into the chambers until the pressure in the chamber equalizes with the pressure in bore 34, e.g. 2000 psi. It can be seen that the air pressure from respective passages 50 will act on respective rear surfaces 65a of pistons 65 to hold both in a closed position. Air pressure in chamber 21 also acts on unbalanced area 65b of piston 65 (FIG. 4) to assist in holding piston 65 in a closed position.

Referring now to FIG. 6, when gun 20 is to be fired, a signal is transmitted through bundle 85, lead 86, to solenoid 80 to open valve 81. This allows air from bores 36 in coupler 31 to flow through passage 37 therein into passage 73, passage 82 in solenoid valve means 80, and into passage 72, 72a of manifold and auxillary blocks 70, 70a, respectively. Air flows from passage 72a simultaneously into passage 48 of the respective cylinder bodies 45 and flows into "firing chambers" 90 (FIG. 5) formed between seal element 87 and surface 8S on piston sleeve valve 65. Minute grooves (dotted lines 89 in FIGS. 4 and 5) are provided on element 87 to allow easy access of air into firing chambers 90.

It will be understood that air under the same pressure, e.g. 2000 psi, as that acting on the small surfaces 65a, 65b of valve 65, will now act on the much larger surface 88 of valve 65 to unbalance the forces thereon and start movement of the valve toward an open position. During initial movement of valve 65, valve means 62 will follow in contact with therewith (e.g. 0.120 inches) under the bias of springs 60 until seat means 62 is stopped by shoulder 63 (FIG. 5) on seal housing 52. This is an important feature of the present invention since valve seat means 62 moves with valve 65 during its initial travel to keep the outlet of the chamber closed until the sleeve valve 65 has accelerated and is rapidly moving towards an open position. When valve seat means 62 is stopped by contact with shoulder 63, rapidly moving valve 65 will then quickly open respective opening 22 and a rapid discharge of air will follow. This rapid discharge of air produces a superior acoustical signature for seismic operations over that produced by the discharge from a gradually opening sleeve valve without moving valve seat means 62.

After valve 65 moves a short distance, e.g. 0.030 inches, vertical ports 67 of the respective valves move past respective "firing" seal 91 (FIG. 5) which now allows air from chamber 21 to flow through ports 67 to act on surfaces 88 of respective piston valves 65. This drives both piston valves quickly and simultaneously to an open position which allows the air charge in each chamber 21 to discharge simultaneously through its respective 360° outlet 22a, 22b.

As the valves 65 move toward their open positions, air in firing chamber 90 is vented to chamber 90a (FIG. 4) through passage 49 in cylinder body 45 thus equalizing the pressure in chambers 90 and 90a and reducing the force driving valves 65 to an open position. Also, after movement of valve 65 is started, valve 81 in solenoid valve means 80 is closed. As valve 65 is moved to its full open position, the air behind surface 65a compresses and acts an air spring to return piston valve 65 back toward its closed position. Air continues to flow through passages 50 to move the valve 65 to its full closed position. Valve 65 will contact seal 66 and move against the bias of springs 60 to effect a good seal of outlet 22. During the return of valve 65 to the closed positiion, air is vented ahead of surface 88 through passages 48, 72a, 72, and 72b in lower manifold block 70 into the water.

It can be seen from the above description, sleeve valves 65 are always moving simultaneous in opposite directions during operation and the forces developed by these movements are always opposite and substantially equal. Accordingly, these forces effectively counterbalance each other thereby substantially reducing the acceleration and deceleration forces, and hence the wear, on gun 20.

Further, due to the symmetry of gun 20, the simultaneous discharging of dual chambers 21 through identical 360° outlets 22 will develop substantially identical reactive forces on the housing of gun 20 which counterbalance each other. This, too, reduces undesirable forces on the seismic array and extends the operational life thereof.

what is claimed is:

1. A valve mechanism for opening and closing the outlet of a chamber in the housing of a seismic air gun, said valve mechanism comprising:
   a sleeve valve slidably mounted in housing and movable to open and close said outlet;
   a valve seat means slidably mounted in said housing;
   means for biasing said valve seat means into contact with said sleeve valve to close said outlet of said chamber, said valve seat means moving with said sleeve valve as said sleeve valve moves toward an open position; and
   means on said housing to stop movement of said valve seat means after said valve seal means has moved a short distance in contact with said sleeve valve whereby said sleeve valve continues to move out of contact with said valve seat means to open said outlet.

2. The valve mechanism of claim 1 wherein said biasing means comprises:
   spring means.

3. The valve mechanism of claim 1 wherein said outlet of said chamber comprises a 360° opening around and through said housing near one end of said chamber.

4. The valve mechanism of claim 3 wherein said valve seat means comprises:
   an annular valve seat sleeve slidably mounted in said housing adjacent said outlet; and
   an annular seal carried by said valve seat sleeve and positioned to contact and seal with said sleeve valve when said outlet is closed.

* * * * *